United States Patent
Riley et al.

[11] Patent Number: 5,856,972
[45] Date of Patent: Jan. 5, 1999

[54] DUPLICATE MESSAGE DETECTION METHOD AND APPARATUS

[75] Inventors: Glen M. Riley, Saratoga; Robert A. Dolin, Jr., Menlo Park, both of Calif.

[73] Assignee: Echelon Corporation, Palo Alto, Calif.

[21] Appl. No.: 706,683

[22] Filed: Sep. 6, 1996

Related U.S. Application Data

[63] Continuation of Ser. No. 299,850, Sep. 1, 1994, abandoned.

[51] Int. Cl.$^6$ .................................................. H04L 12/54
[52] U.S. Cl. ...................................... 370/389; 395/200.68
[58] Field of Search .................................... 370/218, 312, 370/349, 393, 397, 389, 409, 432, 475; 395/200.68

[56] References Cited

U.S. PATENT DOCUMENTS

| | | |
|---|---|---|
| 4,811,009 | 3/1989 | Orimo et al. ...................... 340/825.05 |
| 4,896,261 | 1/1990 | Nolan ....................................... 395/287 |
| 5,089,954 | 2/1992 | Rago ....................................... 395/600 |
| 5,151,899 | 9/1992 | Thomas et al. ......................... 370/94.1 |
| 5,347,269 | 9/1994 | Vanden Heuvel et al. ......... 340/825.44 |
| 5,384,565 | 1/1995 | Cannon .............................. 340/825.44 |
| 5,425,026 | 6/1995 | Mori .......................................... 370/60 |

*Primary Examiner*—Jack A. Lane
*Attorney, Agent, or Firm*—Blakely, Sokoloff, Taylor & Zafman LLP

[57] ABSTRACT

A method of determining a transaction identifier for a message to be sent from a node on a network. The node has an address table and a memory. The method comprising the steps of: accessing the address table to determine an address for the message; and accessing the transaction identifier at a memory location corresponding to the address.

23 Claims, 8 Drawing Sheets

DUPLICATE MESSAGE DETECTION METHOD AND APPARATUS

This is a continuation of application Ser. No. 08/299,850, filed Sep. 1, 1994, now abandoned.

BACKGROUND OF THE INVENTION

1. Field of Invention

The present invention relates to the field of network communications. In particular, the present invention describes improved duplicate message detection.

2. Description of Related Art

In most computer networks, information is communicated using messages. Nodes on the network prepare messages and transmit these messages to other nodes. Each message contains a number of bytes corresponding to the information to be communicated and a number of bytes identifying the message, called the header. These types of networks can be used in control systems. For example, a control system network can be used to control the heating and the ventilation of a large building.

A sender node can request that a receiver node return an acknowledgment. An acknowledgment is a message that is in response to another message. If such a request is made, the sender node will wait for the acknowledgment. If no acknowledgment is received the sender node can then transmit a duplicate of the original message. However, this raises the problem of distinguishing between original messages and duplicate messages. For reliable communications, the receiver should detect that a given message is a duplicate, and the sender node should detect whether a given acknowledgment is a duplicate. The following illustrates an example of the undesirable effects that lack of a duplicate message detection system can have. Assume that the sender node transmits a command to open a valve 10% more. The receiver receives and executes the command. Assume that the acknowledgment from the receiver node has been lost. The sender node would not know that the original message had been received and would then transmit the open valve 10% more command. If the receiver node does not detect this second message as a duplicate, the valve will be opened 20%. Clearly, this could be disastrous.

One previous method of detecting duplicate messages is to use transaction identifiers (transaction ids). A transaction is the start to end process of successfully communicating a message. The transaction id identifies each separate transaction. Transaction ids are also referred to as transaction sequence numbers. A sender node includes a transaction id in each original message. The receiver node remembers this transaction id. If a subsequent message arrives with exactly the same transaction id, then the receiver node knows that the message has been previously received. The receiver node can ignore the command contained in the message. The receiver node also know that it must transmit the acknowledgment. The receiver node includes the transaction id in the acknowledgment. The sender node, upon receipt of the acknowledgment, can end the transaction.

One practical problem with the use of transaction ids is that they can only represent a limited range. That is, after a certain number of transactions, transaction ids must be reused. The set of all possible transaction ids is called the transaction space. Generally, if the receiver node receives two messages with the same transaction id, the receiver node will assume that the second message is a duplicate. To prevent the receiver node from erroneously assuming a second message with a previously used transaction id is a duplicate, previous systems use timers to allow received messages, and their transaction ids, to expire. The receiver node uses a transaction timer for each transaction id.

In Tanenbaum, A. N., Computer Networks, 2nd Edition, at page 429, a large transaction space (e.g. $2^{32}-1$) is defined for use in local and wide area networks. This helps to ensure that when transaction ids start repeating, a sufficient period of time has passed for all previous transactions to have expired. In typical local and wide area networks, the data rates are relatively high, and the number of messages are relatively large. Therefore, using a large number of bits to represent the transaction id in a message is an acceptable design constraint. For example, a transaction id may be only four bytes of a message containing two kilobytes of information.

However, some networks have relatively low data rates and relatively small sized messages. For example, in a networked control system, data rates may be 600 baud. For example, temperature information may only be a few bytes of data. Therefore, requiring a large number of bits to represent the transaction id is unacceptable. One previous system uses a transaction space of sixteen transaction ids. After initiating sixteen transactions, the first node reuses the transaction ids. If, for example, one node is used for configuring many other nodes on the network, then it is quite possible to reuse a transaction id that has not yet expired. This can cause the receiver node to erroneously disregard the information in the second message. LONBUILDER 2.2, available from Echelon Systems of Palo Alto, Calif., supports such a network and communications system.

What is needed is a method and apparatus having improved duplicate message detection, but have an acceptable ratio between the size of the header and the rest of the information to be communicated.

An improved method and apparatus for detecting duplicate messages.

SUMMARY OF THE INVENTION

An improved method and apparatus for detecting duplicate messages is described.

A method of determining a transaction identifier for a message to be sent from a node on a network. The node has an address table and a memory. The method comprising the steps of: accessing the address table to determine an address for the message; and accessing the transaction identifier at a memory location corresponding to the address.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview

An improved method and apparatus for detecting duplicate messages is described. In the following description, numerous specific details are set forth such as a variable configuration table entry format, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Some embodiments of the present invention use different data structures than those described in detail herein. For example, sets, collections, lists, or arrays, can be used instead of tables. Therefore, when a reference is made to a particular data structure, a different data structure can be substituted without deviating from the scope of the invention. Often, what is important is the kinds of data contained in the data structures, not necessarily the actual data structures themselves.

In one embodiment of the present invention, a separate transaction id space is maintained for each address that a sender node can communicate to (the sender node's list of addresses). This effectively increases the usable transaction space for each network address, without increasing the number of bits needed to represent a transaction id. In one embodiment, duplicate addresses can occur in the sender node's list of addresses. In this embodiment, the sender node uses the same transaction space for the two (or more) addresses. This helps prevent a receiver from erroneously identifying a message as being a duplicate message.

A NODE

Figure 1:
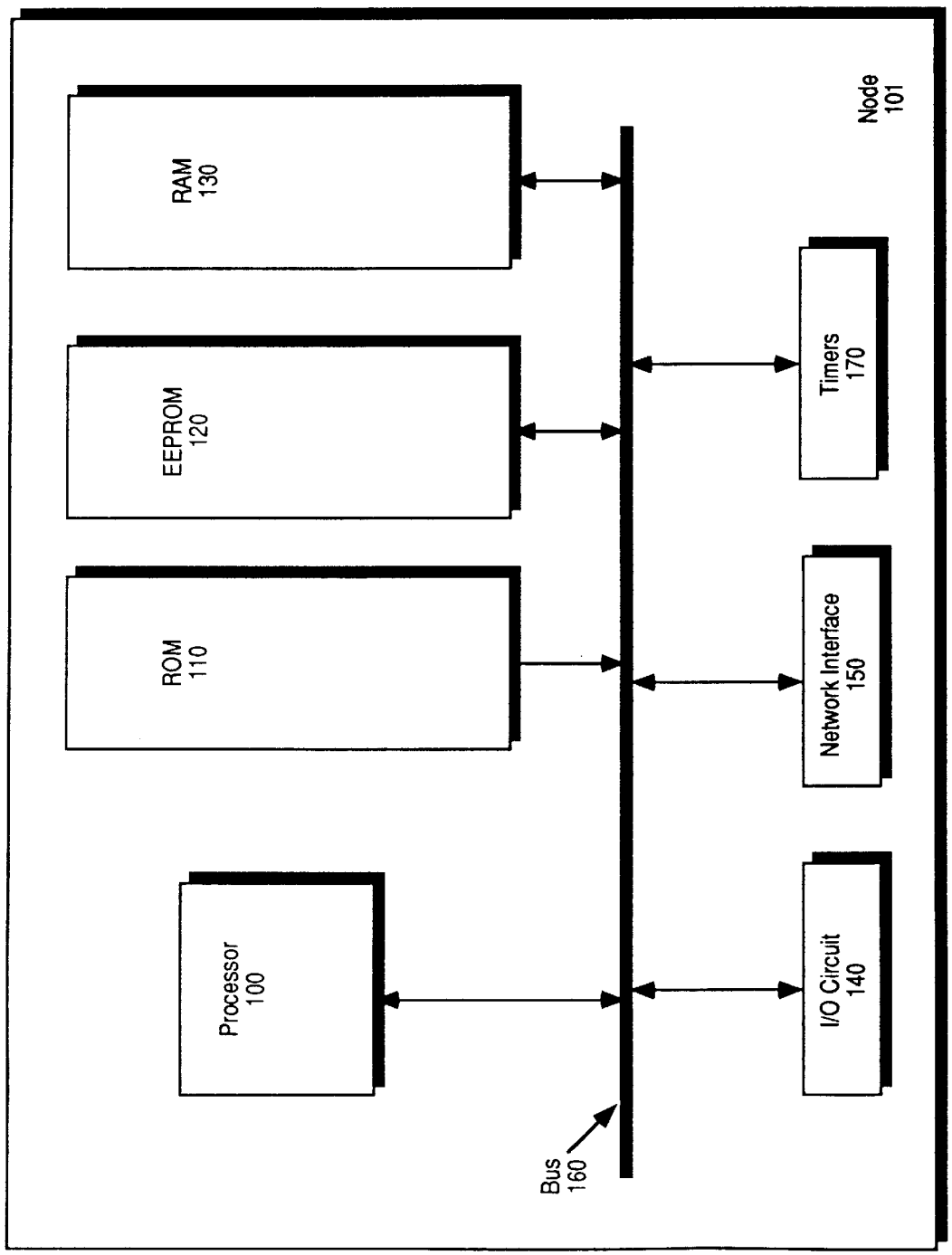
FIG. 1 illustrates a node upon which one embodiment of the present invention can be implemented.

FIG. 1 illustrates a node as may be used by one embodiment of the present invention. Node 101 includes a number of circuits which can be used to control devices and communicate on a network. Node 101 includes processor 100, ROM 110, EEPROM 120, RAM 130, I/O circuit 140, network interface 150, and timers 170. Motorola of Austin, Tex., supplies such nodes (e.g. MC143150 and MC143120).

Processor 100 controls all the other circuits on the node. Processor 100 communicates to the other nodes by bus 160. Application programs and network software can be executed on processor 100.

ROM 110 is also coupled to bus 160. ROM 110 is permanent storage for initialization routines and fundamental node control routines, for example.

EEPROM 120 is also coupled to bus 160. EEPROM 120 is typically used for storing information which changes rarely. For example, EEPROM 120 may store an address table for network addresses. EEPROM 120 is also used to store information, which although changing, should not be lost in the event of a power loss. In another embodiment, EEPROM 120 can be replaced with any static or pseudo-static storage device.

RAM 130 is coupled to bus 160. RAM 130, typically, is used to store data which can vary often. For example, transaction ids can be stored in RAM 130.

I/O circuit 140 is coupled to bus 160. I/O circuit 140 is used to connect to the device, or devices, being controlled by the node 101. For example I/O circuit 140, can be used to control the on/off switch of a ventilation system.

Network interface 150 is coupled to bus 160. Network interface 150 couples to the network medium and is used to communicate with other nodes on the network. The network medium can be any of a number of mediums, such as, twisted pair, wireless communications, or power lines.

Timers 170 is also coupled to bus 160. Processor 100 can set timers in timers 170 for later polling. In another embodiment, processor 100 can use timers 170 as interrupts. For example processor 100 may set a timer when a message is sent out. If the timer expires before the acknowledgment is received, then processor 100 can take the appropriate action.

Other combinations of circuits can be used in node 101. For example, the memory contained in ROM 110, and EEPROM 120 can be combined into one larger EEPROM 120. In another embodiment, RAM 130 could be included in EEPROM 120. Processor 100 can be implemented in a number of processors rather than just the one shown in FIG. 1. One processor may be responsible for controlling I/O circuit 140 and another processor may be responsible for controlling access to the memories. In another embodiment of node 101, I/O circuit 140 can be a number of I/O circuits, all of which support different types of I/O. Further, node 101 can be implemented on one or more substrates, and in one or more packages.

AN EXAMPLE CONTROL SYSTEM

Figure 2:
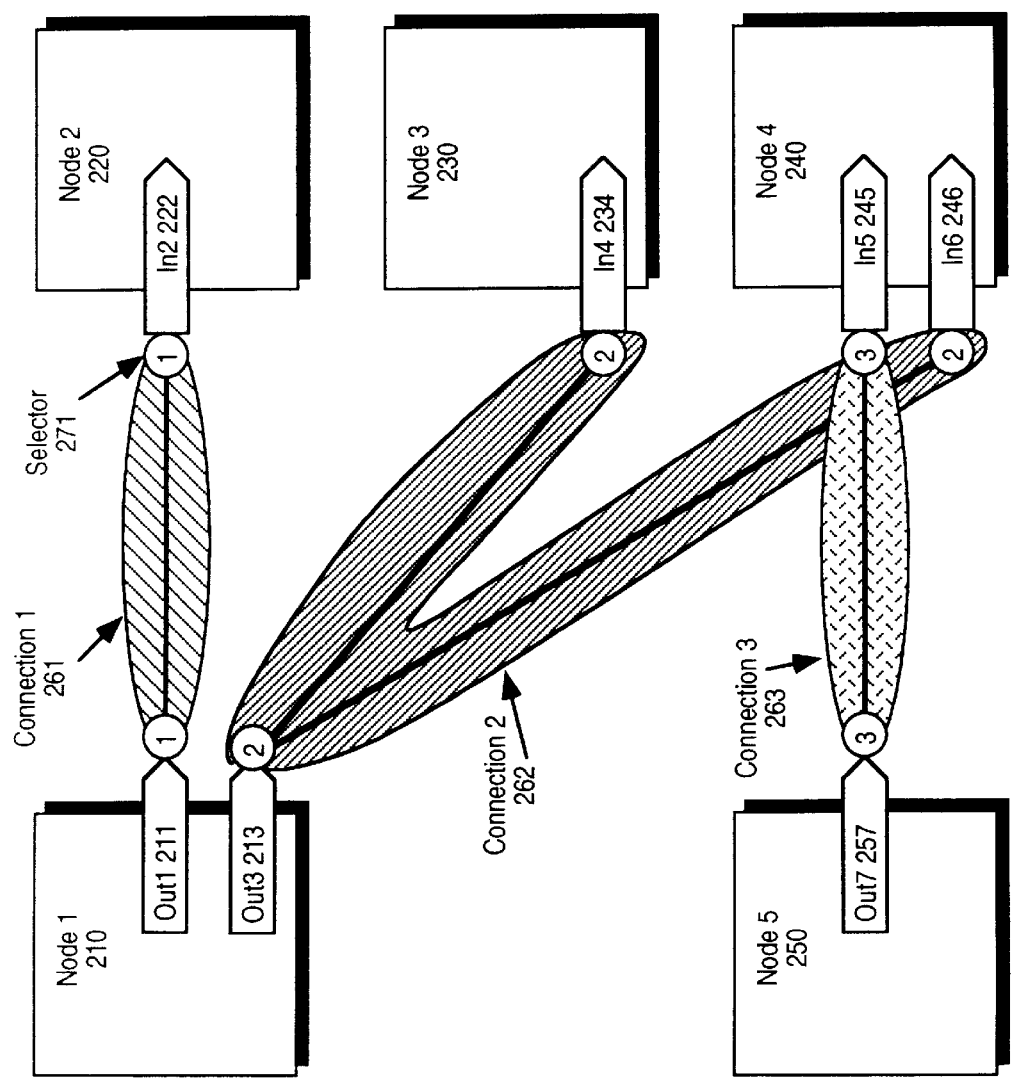
FIG. 2 illustrates an example control system network.

FIG. 2 illustrates an example control system network. The network can be used to control the heating and ventilation system of a building for example.

The network includes five nodes: node 1 210, node 2 220, node 3 230, node 4 240, and node S 250. Each node has a number of variables. Node 1 210 has variables out1 211 and out3 213. Node 2 220 has variable in2 222. Node 3 230 has variable in4 234. Node 4 240 has variables in5 245 and in6 246. Node 5 250 has variable out7 257. An application executing on one node can transmit information to another application on another node using these types of variables.

Each variable is either an output variable or an input variable. Output variables are generators of original messages. For example, out1 211 can represent the temperature sensed by a sensor coupled to node 1 210. Input variables receive messages and act on these messages. For example, in2 222 can receive the temperature information and cause node 2 220 to activate an air conditioner.

Between the nodes are three connections: connection 1 261, connection 2 262, and connection 3 263. Connection 1 261 connects out1 211 to in2 222. Connection 2 262 connects out3 213 to both in4 234 and in6 246. Connection 3 263 connects out7 257 to in5 245.

A connection logically connects variables in the network. Each connection is responsible for communicating between an output variable and input variables. When a connection is made between the output of one node and the input of another node, a unique name is created and assigned to that connection. That unique name is called a selector (see, for example, selector 271). For each connection, that selector is associated with the input or output variable for that node.

Of course this is but an exemplary network and other networks can include many more nodes, and use many more variables.

MESSAGING EXAMPLES

Figure 3:
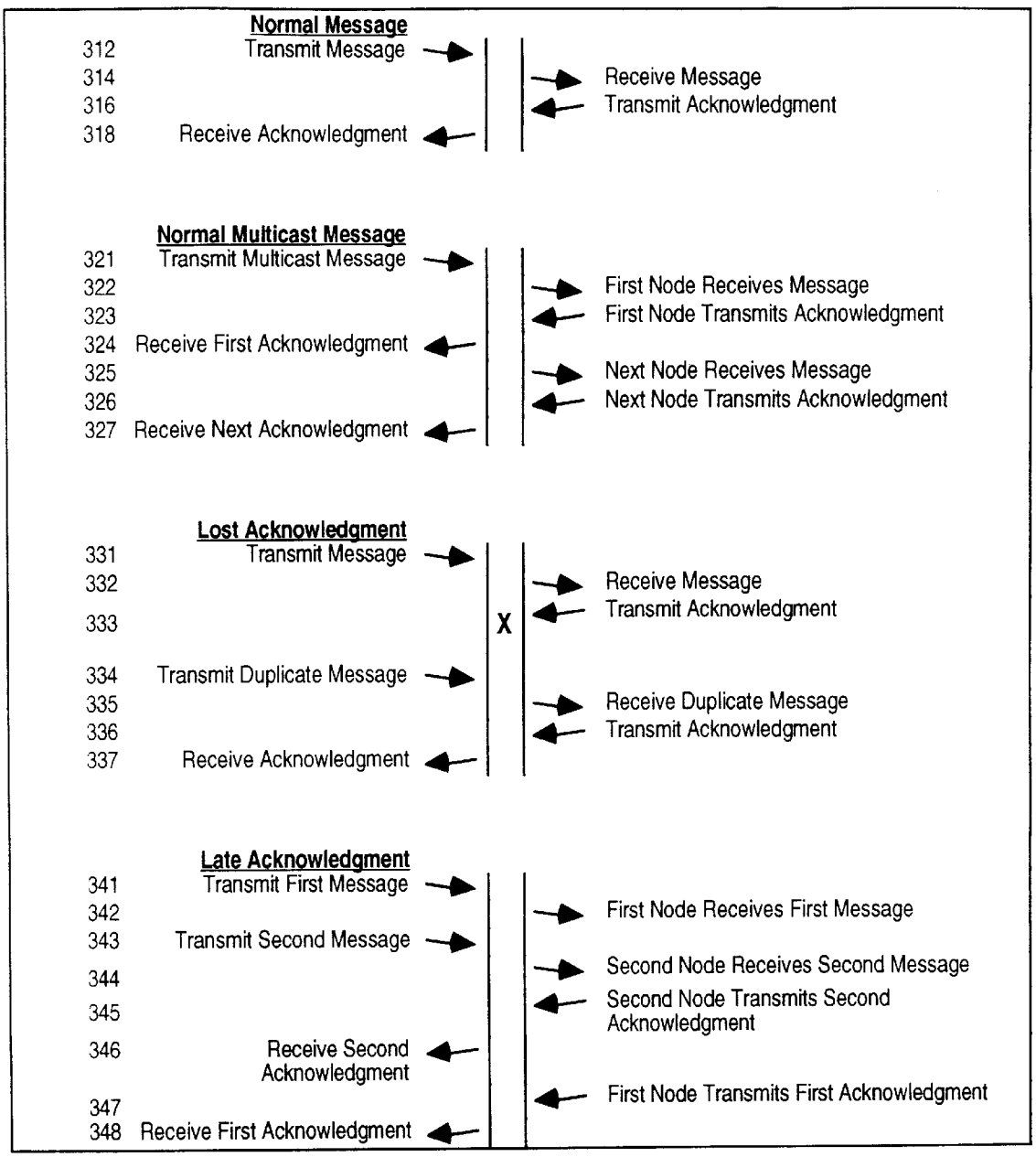
FIG. 3 illustrates messaging examples as may occur on a network.

FIG. 3 illustrates messaging examples as may occur on a network. All these examples require receiver nodes to transmit acknowledgments. For each messaging example, each line illustrates some activity. Activity on the left hand side corresponds to the sender node's activity. Activity on the right hand side corresponds to the receiver nodes' activity.

The first example illustrates a complete normal message transaction between two nodes. This type of transaction can occur on connection 1 261. At 312, the sender transmits a message. At 314, the receiver receives the message. At 316, the receiver transmits an acknowledgment. At 318, the sender receives the acknowledgment, thereby completing the transaction.

The next example illustrates a normal multicast message transaction from one node to two other nodes. This type of transaction can occur on connection 2 262. At 321, the sender transmits a multicast message addressed to two receivers. At 322, the first receiver receives the multicast message. At 323, the first receiver transmits an acknowledgment. At 324, the sender receives the first acknowledgment. At 325, the next receiver receives the multicast message. At 326, the next receiver transmits an acknowledgment. At 327, the sender receives the acknowledgment. This completes the multicast message transaction.

The next example illustrates a normal message transaction where the acknowledgment has been lost. At 331, the sender transmits a message. At 332, the receiver receives the message. At 333, the receiver transmits an acknowledgment. However, the acknowledgment is lost. This can occur, for example, because of electrical interference. At 334, the sender transmits a duplicate message. At 335, the receiver receives the duplicate message. For reliable communications, the receiver should detect that this message is a duplicate message. At 336, the receiver transmits a second acknowledgment. At 337, the sender receives the second acknowledgment. This completes the transaction.

The last example illustrates two normal message transactions. However, the acknowledgment from the first transaction is delayed. At 341, the sender transmits a first message. At 342, the first node receives the first message. At 343, the sender transmits a second message. At 344, the second node receives the second message. At 345, the second node transmits a second acknowledgment. At 346, the sender receives the second acknowledgment. For reliable communications, the sender node should be able to distinguish between a first acknowledgment and a second acknowledgment. Assuming that the sender can distinguish between the two acknowledgments, the sender can end the second transaction. At 347, the first node transmits a first acknowledgment. At 348, the sender node receives the first acknowledgment. The sender can now end the first transaction.

A PORTION OF A SENDER NODE'S MEMORY

Figure 4:
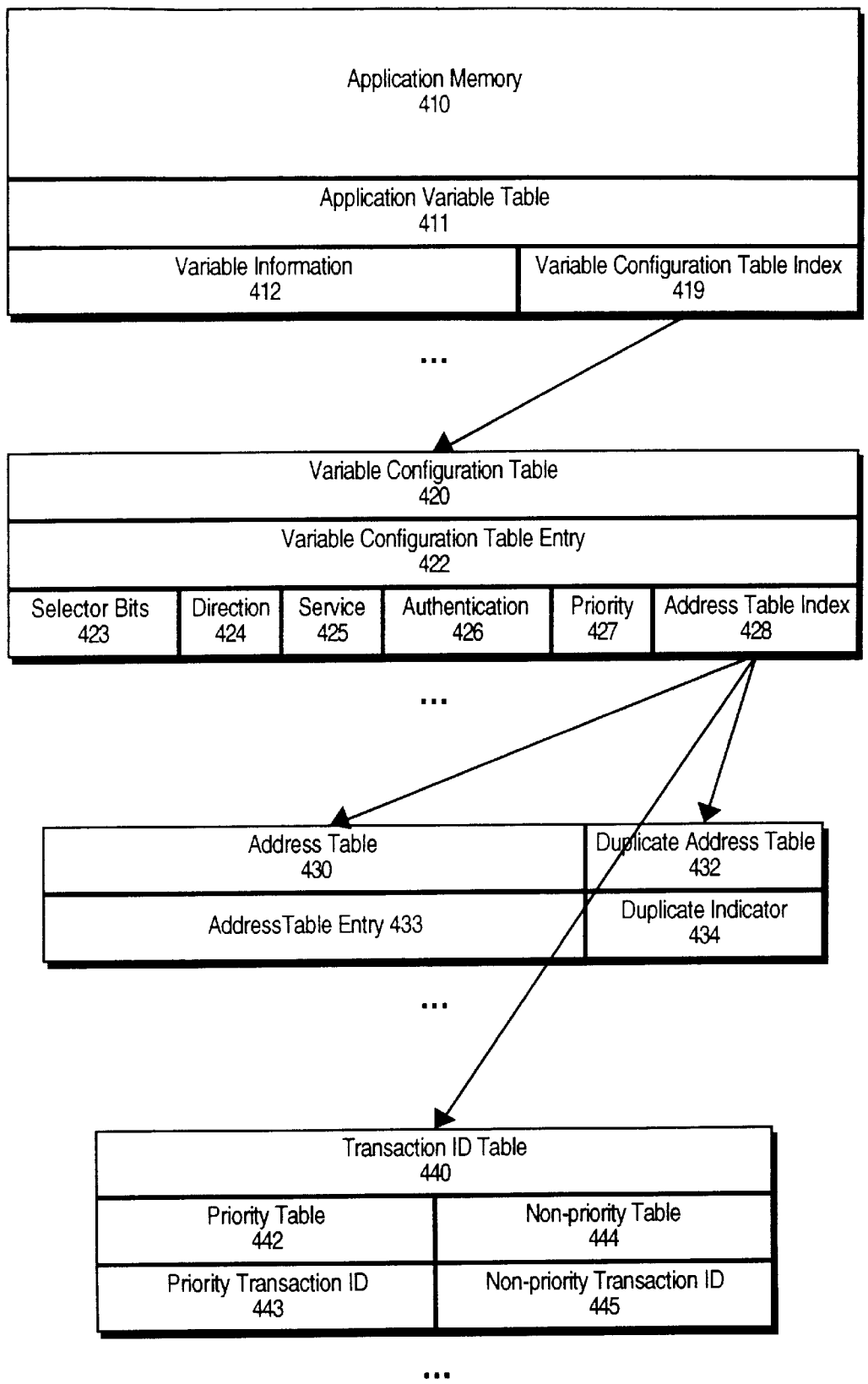
FIG. 4 illustrates a portion of sender node's memory.

FIG. 4 illustrates a portion of sender node's memory. This memory organization can be implemented on, for example, node 101.

The application memory 410 represents the block of memory used to store the program, or application, that a node executes. Application memory 410 includes an application variable table 411. The application variable table 411 contains references to the variables that can be communicated to nodes in the network. An application initiates a transmission of variable information by changing information pertaining to a variable in the application variable table 411. Application variable table 411 includes a number of entries. Each entry corresponds to a variable. Each entry includes variable information 412, relevant to a particular variable (e.g. the variable's length, a pointer to the variable in memory), and a variable configuration table index 419.

In another embodiment of the present invention, application memory 410 includes multiple programs and multiple application variable tables.

The variable configuration table index 419 is used to index into the variable configuration table 420. The variable configuration table is used to hold information about how a variable is to be communicated in the network. The variable configuration table 420 includes a variable configuration table entry 422 for each variable in the application variable table 411.

Each variable configuration table entry 422 includes: selector bits 423; direction 424; service 425; authentication 426; a priority 427; and an address table index 428. The selector bits 423 represent a selector to be used with a particular variable. For example, the selector bits 423 can represent selector 271. The direction 424 indicates whether a variable is an input variable or an output variable. The service 425 indicates the type of service to be used when transmitting a variable. Possible types of service are: unacknowledged, unacknowledged repeat, and acknowledged. These types of services are described in the LONTALK® Protocol Engineering Bulletin, April 1993, available from Echelon Systems Incorporated. Authentication 426 indicates whether a message must be authenticated using an authentication process. An example of an authentication process is described in the LONTALK® Protocol Engineering Bulletin, April 1993. Priority 427 determines at which priority a message corresponding to the variable is to be sent on the network. In one embodiment, the message can be sent as priority or non-priority.

The address table index 428 is an index for an address table 430. Each address table entry 433 includes the network address for a node that a sender node can communicate with. Multiple variable configuration table entries can index the same address table entry 433. This would occur, for example, where one node communicates multiple variables with a second node. Each address table entry 433 can also include information pertaining to how many duplicate messages should be sent before a transaction is consider to have failed (the retry value), and how long should a node wait before transmitting a duplicate message.

Associated with the address table 430 is the duplicate address table 432. This table indicates whether any particular address in the address table 430 has been duplicated. In one embodiment of the present invention, the address table index is used to access an entry in the duplicate address table 432. Duplicate addresses may be contained in the address table 430, if, for example, different retry values are needed for variables being transmitted to the same node. Duplicate address table 432 includes a duplicate indicator 434 for each address table entry 433. In one embodiment, the duplicate indicator 434 is a single bit. If the bit is set, then a duplicate address exists in the address table 430 for the address corresponding to that particular duplicate indicator 434. The need for the duplicate address table 432 will be discussed below.

The transaction id table 440 includes the next transaction id to be used for each address in the address table 430. This differs from one previous system in that the transaction ids were not associated with addresses in the address table 430.

In the prior art system, transaction ids are shared among all the destination addresses specified in the address table 430. In one embodiment of the present invention, allocating a transaction id according to a corresponding address helps to prevent the following problem. Assume a sender has a transaction space of 16 transaction ids. A sender transmits a message to a first node using transaction id 1. The sender then initiates 15 other transactions with other nodes on the network. Each transaction uses a different transaction id. The sender then initiates a second transaction with the first node. This second transaction will have the transaction id 1. If the first node has not allowed the first message to expire, the first node will erroneously identify the second message as a duplicate message.

Note that in this embodiment of the present invention, the transaction space has been effectively increased without having to change the format of the messages on the network. That is, messages on the network contain the same size transaction id, but from the sender's perspective, each receiver has its own transaction space.

In one embodiment, a separate transaction space is maintained for each address in the address table 430. Therefore, the transaction id space is not shared among all the nodes in that a particular node can communicate with.

In one embodiment of the present invention, the address table index 428 is normally used to index the transaction id table 440. If a duplicate indicator 434 indicates a duplicate address exists for a particular address, then in one embodiment of the present invention, the address table 430 is searched for the first address table entry 433 including that address. The index of the first address table entry 433 is then used to index the transaction id table 440. Searching the address table 430, in the event of a duplicate address, is discussed below.

Whichever index is used, the transaction id stored in the transaction id table is the transaction id to be used for a new transaction with a particular node. The indexed transaction id is stored in a transaction record. When the transaction is complete, the transaction record is discarded.

In one embodiment of the present invention, transaction id table 440 includes priority table 442 and non-priority table 444. These two tables are included because, in this embodiment, variables can be transmitted using either priority and non-priority messages. If a variable is to be transmitted using a priority message, then the index into the transaction id table 440 is used to index a priority transaction id 443. If a variable is to be transmitted using a non-priority message, then the index into the transaction id table 440 is used to index a non-priority transaction id 445.

Each block of table described above can be stored in the memories of node 101. For example, application memory 410, variable configuration table 420, address table 430, and duplicate address table 432, can be stored in any of ROM 110, EEPROM 120, or RAM 130. Transaction id table 440 can be stored in EEPROM 120 or RAM 130. Given the description contained herein, other possible methods of representing and storing the information in these tables are evident. For example, the information in the tables can be represented as linked lists, or rather than indexing the tables, content addressable memory can be used.

In one embodiment, upon a reset, all the transaction ids in the transaction id table 440 are set to zero. The transaction space, in this embodiment, is normally one through fifteen, with zero being reserved for the first transaction after a reset. In one embodiment of the present invention, when a duplicate address is deleted from address table 430, the corresponding transaction id table 440 entry is reset to zero.

SENDER NODE TRANSACTIONS INITIATION

Figure 5:
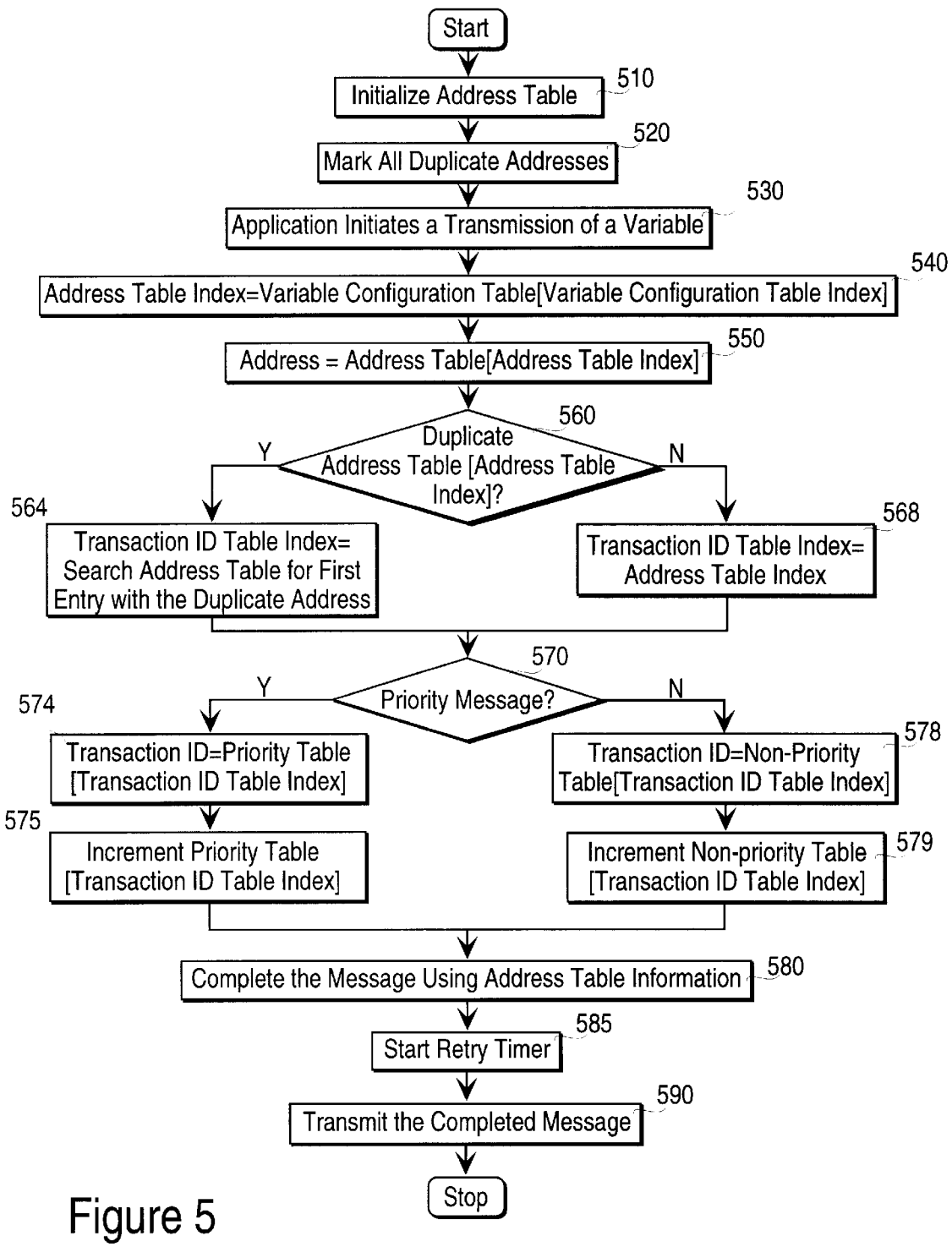
FIG. 5 illustrates a technique used by sender nodes to generate a transaction identifier and send a message using that transaction identifier.

FIG. 5 illustrates a technique used by sender nodes to generate a transaction identifier and send a message using that transaction identifier. This technique can be used in node 101 using the memory organization described in FIG. 4. Variations of this technique can be employed without deviating from the scope of this invention. At step 510, the address table 430 is initialized. In one embodiment, this includes the step of writing to EEPROM 120 all the network addresses that node 101 will be communicating with.

At step 520, all the duplicate addresses are marked in duplicate address table 432. In one embodiment, this includes, prior to writing step 510, determining which network addresses will be repeated in the address table 430. Then, when the address table 430 is written, the corresponding entries in the duplicate address table 432 are marked.

At step 530, an application initiates a transmission of a variable. This can occur, for example, by an application changing a value of a variable corresponding to an application variable table 411 entry.

At step 540, an address table index 428 is located in the variable configuration table 420, using the variable configuration table index 419.

At step 550, the address for the message being transmitted is retrieved using the address table index 428. Typically, this includes performing a memory access in the memory used by the address table 430 using the address table index 428.

At step 560, the duplicate address table 432 is accessed using the address table index 428 to determine whether a duplicate address exists. If a duplicate address does not exist, then at step 568, the transaction id index used to access the transaction id table 440 is the same as the address table index 428. If a duplicate address does exist, then at step 564, the transaction id index is the index of the first address table entry 433 that includes the duplicated address. In another embodiment of the present invention, the index of the last occurrence of the duplicated address is used. In any case, what is important is to use a deterministic method of using the same transaction id space for the same network address. The importance of this is discussed below.

At step 570, a test is made to determine whether the present message is to be sent priority or non-priority. If the message is to be sent priority, then at step 574, the transaction id table index is used to access the transaction id stored in the priority table 442 at that index. In one embodiment, at step 575, the transaction id stored in the indexed location in the priority table 442 is incremented. If the message is to be sent non-priority, then at step 578, the transaction id table index is used to access the transaction id stored in the non-priority table 444 at that index. In one embodiment, at step 579, the transaction id stored in the indexed location in the non-priority table 444 is incremented. Step 575 and step 579 ensure that the next transaction initiated for that address and priority will use a different transaction id.

At step 580, the message is completed using the address table 430 information.

At this time, a transaction record is made so that if a duplicate message needs to be transmitted, the same transaction id and other information can be used.

At step 585, the retry timer is started, if necessary.

At step 590, the completed message is transmitted.

In other embodiments of the present invention, some of the above steps are reordered. For example, step 580, step 585, and step 590, can occur simultaneously, or in a different order.

A PORTION OF A RECEIVER NODE'S MEMORY

Figure 6:
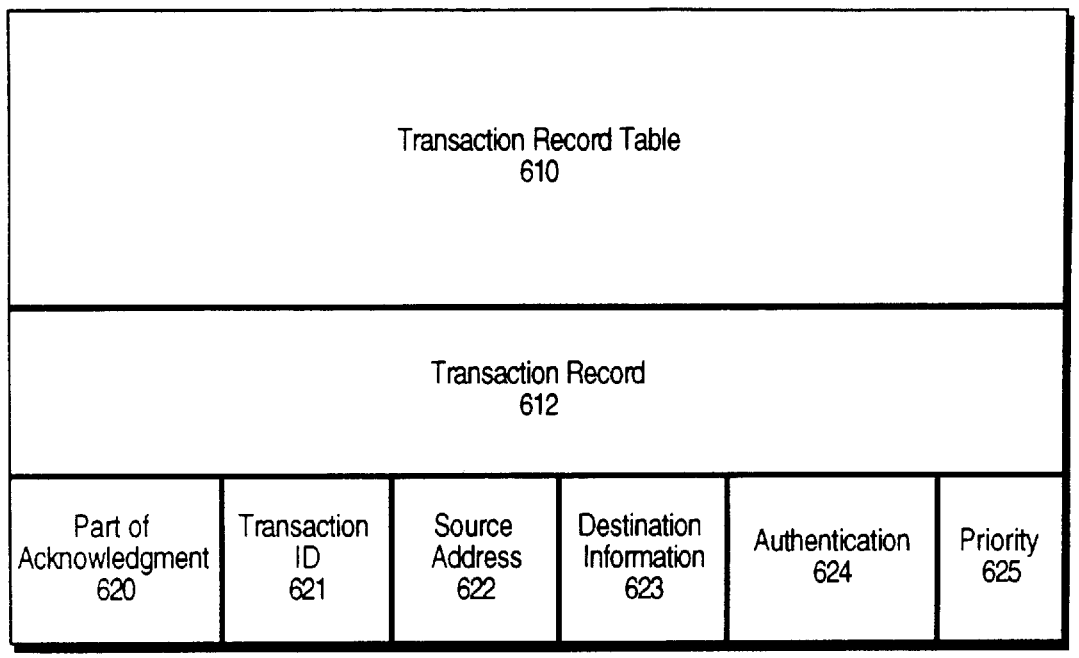
FIG. 6 illustrates a portion of a receiver node's memory.

FIG. 6 illustrates a portion of a receiver node's memory. In particular, FIG. 6 illustrates the block of memory used to track transactions. This block of memory can be used, for example, by node 101 to track incoming transactions.

Transaction record table 610 contains a list of pending transactions for a receiver node. The transaction record table 610 allows the receiver node to more accurately identify duplicate messages. Each transaction record 612 contains information pertaining to a separate transaction.

A transaction record 612 includes: a part of an acknowledgment 620; a transaction id 621; a source address 622; destination information 623; authentication 624; and priority 625.

The part of the acknowledgment 620 is used in case a duplicate message is received and a duplicate acknowledgment needs to be generated.

The transaction id 621 is the transaction id for corresponding transaction.

The source address 622 is the address of the source node that initiated the transaction.

The destination information 623 includes the type of message, and if the message is a group address the group number.

The authentication 624 represents whether the original transaction used authentication.

Priority 625 represents whether the original message was a priority message.

The receiver uses each of the transaction id 621, the source address 622, the destination information 623, the authentication 624 and the priority 625 to detect a duplicate message.

RECEIVING A MESSAGE

Figure 7:
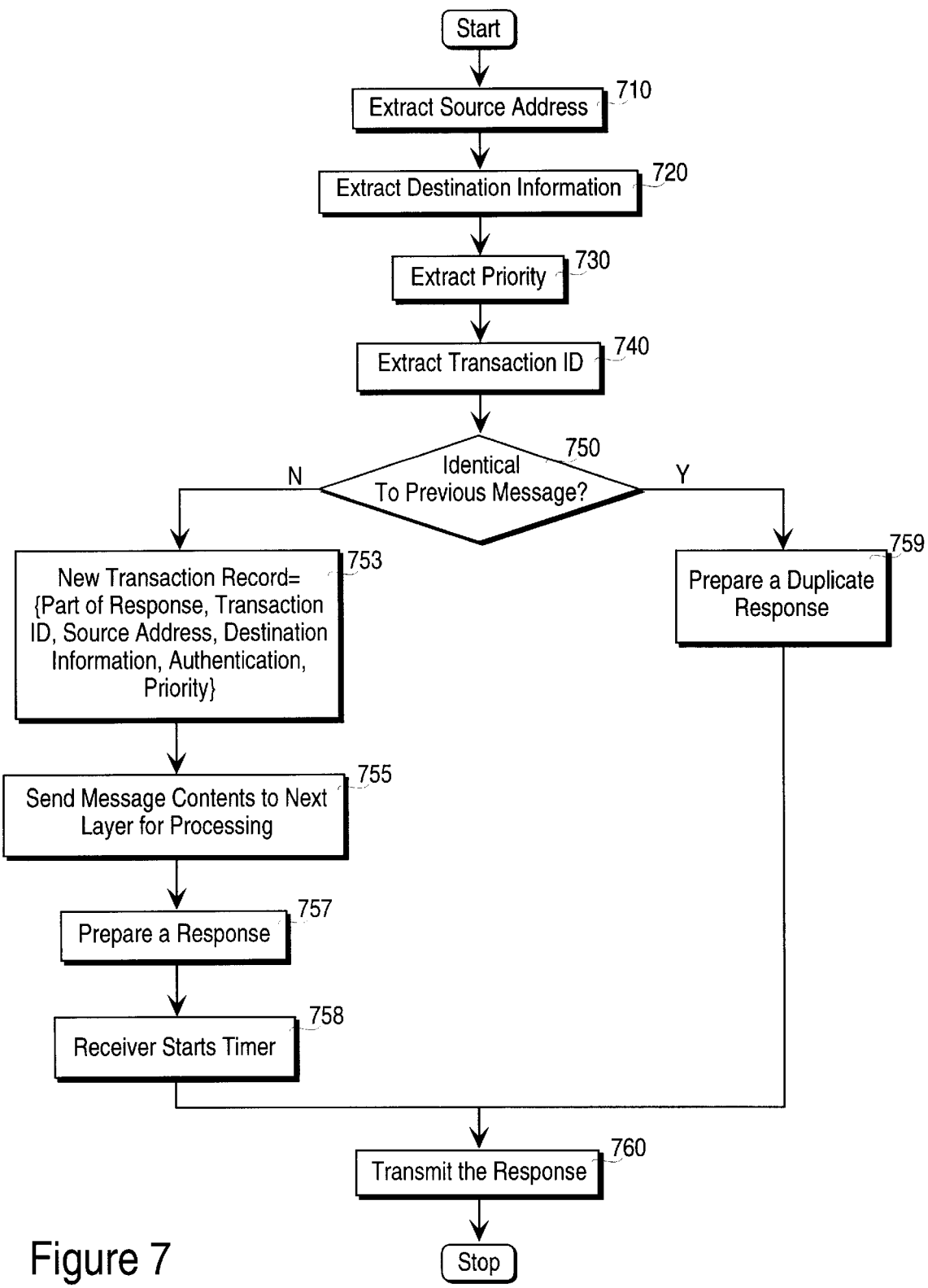
FIG. 7 illustrates a technique used by receiver nodes for receiving messages.

FIG. 7 illustrates a technique used by receiver nodes for receiving messages. This technique can be implemented on node 101 using the transaction record table 610. This technique can be used to implement the activity 314 and activity 316 of a receiver node.

At step 710, the receiver extracts the source address from the received message.

At step 720, the receiver extracts the destination information from the message.

At step 730, the receiver extracts the priority of the message.

At step 740, the receiver extracts the transaction id of the message.

At step 750, the receiver determines if an identical message has been received. This is done by comparing the information extracted in step 710 through step 750, with each transaction record 612.

The reason that duplicate addresses are detected in the sender's address table 430 is now described. If a sender does not use the same transaction space on a per network address, then a receiver node may not be able to correctly detect a duplicate. Assume that the sender node includes a duplicate address in its address table 430. A receiver node may receive a first message using a transaction id corresponding to the first occurrence of the address in the address table 430. The receiver may then receive a message using a transaction id corresponding to a second occurrence of the address in the address table 430. If the two transaction ids happened to be the same and the receiver cannot distinguish between the two different messages from the destination information and priority, then the receiver node will erroneously consider the second message to be a duplicate.

If the received message is a duplicate, then, at step 759, the receiver prepares a duplicate acknowledgment. The receiver's application may not even need to be notified of the duplicate acknowledgment.

If the received message is not a duplicate, then, at step 753, a new transaction record 612 is created. The message provides the transaction id 621, the source address 622, the destination information 623, the authentication 624, and the priority 625. The receiver prepares the appropriate acknowledgment and also stores at least a portion of this acknowledgment in the transaction record 612.

At step 755, the receiver sends the remainder of the message contents to the next level of the network protocol for processing. Where applicable, the application executing on the receiver node will be given the newly received information.

At step 757, the receiver completes the preparation of the acknowledgment. From this information, the portion of the acknowledgment is obtained.

At step 758, the receiver starts a timer for the transaction record. This timer will cause the transaction record to expire within a predetermined period of time. In one embodiment, this period is approximately equal to the time expected for an original message, and all the possible corresponding duplicate messages, to be received by the receiver node.

At step 790, the receiver transmits the prepared acknowledgment.

As with the sending technique, some of these steps may be combined or reordered. For example, step 758 and step 790 could be combined or executed in a different order.

RECEIVING AN ACKNOWLEDGMENT

Figure 8:
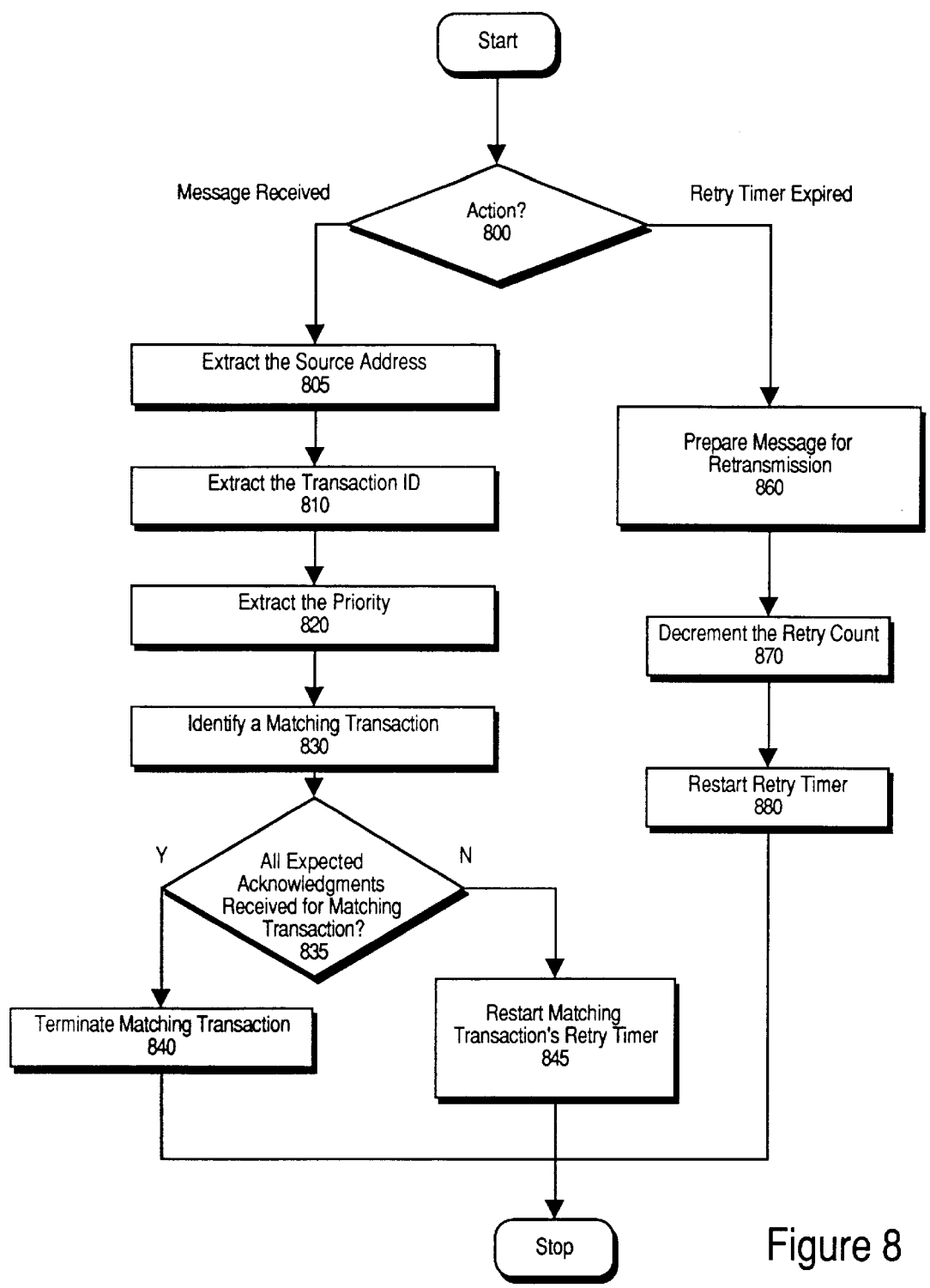
FIG. 8 illustrates a technique used by sender nodes for receiving acknowledgments.

FIG. 8 illustrates a technique used by sender nodes for receiving acknowledgments. This technique can be implemented on node 101.

At step 800, the sender node determines whether a message (e.g. an acknowledgment) has been received or whether a duplicate message needs to be transmitted.

At step 805, assuming a message has been received, the source address of the acknowledgment is extracted (i.e. the address of the receiver node).

At step 810, the sender extracts the transaction id from the message. This transaction id should match a transaction id previously used.

At step 820, the priority of the message should be extracted.

At step 830, the sender identifies a matching transaction using the information extracted in step 805 through step 820. Using all this information allows the sender to more reliably detect late acknowledgments, as generally described in activity 341 through activity 348. If no matching transaction is identified, then the acknowledgment is discarded. Note that typically, the sender keeps a record of all outstanding transactions, much like the receiver.

At step 835, the sender determines whether all the expected acknowledgments have been received for the matching transaction. If the matching transaction corresponds to, for example, a multicast message with acknowledge, then the sender must determine whether acknowledgments from all the receiver nodes have been received.

If all the acknowledgments have been received, then at step 840, the matching transaction is terminated.

If all the acknowledgments have not been received, then at step 845, the retry timer for the matching transaction is restarted.

Returning to step 800, if a retry timer has expired for a transaction in the sender's transaction records, then, at step 860, a duplicate message is prepared. The sender uses the transaction id stored in the corresponding transaction record.

At step 870, the sender decrements the retry counter for the transaction record.

As step 880, the sender node starts the retry timer for the transaction record.

An improved method and apparatus for detecting duplicate messages has been described.

What is claimed is:

1. An apparatus for communicating messages on a network, said apparatus including:
    a memory including a plurality of addresses and representing a plurality of transaction spaces, each transaction space of said plurality of transaction spaces including a plurality of transaction identifiers, each address of said plurality of addresses corresponding to a different transaction space of said plurality of transaction spaces, wherein one of said transaction identifiers in each of said transaction spaces is a next transaction identifier)to be used for a corresponding one of said addresses; and
    a processor for preparing a message, said message including an address of said plurality of addresses and a transaction identifier of said plurality of transaction identifiers.

2. The apparatus of claim 1 wherein said plurality of addresses includes a first address and a second address, said second address being a duplicate of said first address, and wherein said first address and said second address share a common transaction space.

3. The apparatus of claim 1 wherein said plurality of addresses are stored as an address table, wherein said plurality of transaction spaces is represented as a transaction identifier table, and wherein each entry in said address table corresponds to a different entry in said transaction identifier table.

4. A method for determining a transaction identifier for a message to be sent from a node on a network, said node having an address table and a memory, said method comprising the steps of:
    accessing the address table to determine an address of a destination for said message; and
    accessing said transaction identifier at a memory location corresponding to said address to determine the transaction identifier of the message to be sent.

5. The method of claim 4 wherein said step of accessing said address table includes the steps of:
    determining an address table index corresponding to a variable;
    accessing a memory location in said address table corresponding to said address table index.

6. The method of claim 5 wherein said node includes a variable configuration table, and wherein said node is executing an application, and said application includes a variable, said step of determining an address table index includes the steps of:
    said application initiating a transmission of said variable; and
    accessing said variable configuration table, at a memory location corresponding to said variable, to determine said address table index.

7. The method of claim 4 further comprising the steps of:
    determining whether a duplicate address exists; and
    if said duplicate address exists, then said step of accessing said transaction identifier at said memory location corresponding to said address includes a step of accessing said transaction identifier at a memory location corresponding to said duplicate address.

8. The method of claim 7 wherein said node includes a duplicate address table and wherein said step of determining whether a duplicate address exists includes the steps of:
    accessing a duplicate indicator in said duplicate address table at a memory location corresponding to said memory location corresponding to said address; and
    testing whether said duplicate indicator has been set.

9. The method of claim 7 wherein said step of accessing said transaction identifier at a memory location corresponding to said duplicate address includes the steps of:
    searching said address table for a first occurrence memory location of an address matching said address; and
    accessing said transaction identifier at a memory location corresponding to said first occurrence memory location.

10. The method of claim 4 wherein said node includes a priority transaction identifier table and a non-priority transaction identifier table and wherein the step of accessing said transaction identifier at a memory location includes the steps of:
    determining a priority for said message;
    if said message is a priority message, then accessing said transaction identifier at a memory location in said priority transaction identifier table; and
    if said message is a non-priority message, then accessing said transaction identifier at a memory location in said non-priority transaction identifier table.

11. The method of claim 4 further including the step of incrementing said transaction identifier at said memory location corresponding to said address.

12. The method of claim 4 wherein said transaction identifier is four bits in length.

13. A node for preparing a message for transmission to one of a plurality of other nodes on a network, said node comprising:
    a memory including an address table and a transaction identifier table, said address table including a plurality of addresses, said transaction identifier table including a plurality of transaction spaces each of said transaction spaces including at least one of a plurality of transaction identifiers, each of said addresses corresponding to one of said transaction spaces, said transaction identifiers including, for each of the other nodes on the network, a transaction identifier for a next transmission to such other node; and
    a processor coupled to said memory, said processor for preparing said message, said message including one of said addresses and one of said transaction identifiers.

14. The node of claim 13 wherein a memory location in said transaction identifier table is indexed using an index used to access a memory location in said address table.

15. The node of claim 13 wherein:
    said memory further includes a duplicate address table, said duplicate address table including a first duplicate indicator corresponding to said memory location in said address table; and
    said processor is for accessing said first duplicate indicator to determine whether a duplicate address exists in said address table.

16. The node of claim 15 wherein said memory location in said address table includes an address, and wherein said duplicate address corresponds to a first occurrence of said address in said address table.

17. A method of generating a transaction identifier for a message, said message to be sent on a network from a node, said message including information for a second node in said network, said node including a processor and a memory, said processor being coupled to said memory, said node being coupled in communications with said network, said method comprising the steps of:

accessing a variable configuration table index stored in said memory;

using said variable configuration table index to determine an address table index;

accessing a duplicate address table stored in said memory, using said address table index, to determine whether a duplicate address exists for an address identified by said address table index;

accessing a transaction identifier table stored in said memory, as follows:

if a duplicate address exists, accessing said transaction identifier in said transaction identifier table at an index corresponding to a predetermined occurrence of said address in an address table, said address table being stored in said memory, and if no duplicate address exists, accessing said transaction identifier in said transaction identifier table at an index corresponding to said address table index.

18. The method of claim 17 wherein said predetermined occurrence is a first occurrence of said address in said address table.

19. The method of claim 17 wherein said predetermined occurrence is a last occurrence of said address in said address table.

20. The method of claim 17 wherein said transaction identifier is four bits long.

21. The method of claim 17 wherein said step of accessing said variable configuration table includes a step of determining a priority for said message, and wherein said priority is used in said step of accessing said transaction identifier.

22. An apparatus for communicating messages on a network, said apparatus including:

a memory including a plurality of addresses and representing a plurality of transaction spaces, each transaction space including at least one of a plurality of transaction identifiers, each address corresponding to a different one of the transaction spaces, the transaction spaces including a next transaction identifier to be used for each of the addresses; and a processor for preparing a message, said message including an address of said plurality of addresses and a transaction identifier of said plurality of transaction identifiers.

23. A method of generating a transaction identifier for a message to be sent from a first node to a second node on a network including a plurality of nodes, said first node including a processor and a memory coupled to said processor, said method comprising the steps of:

allocating a plurality of transaction spaces in said memory, such that each of said transaction spaces corresponds to one of a plurality of addresses, each of said addresses corresponding to one of said plurality of nodes with which said first node can communicate over said network; and storing a transaction identifier in each of said transaction spaces, each of said transaction identifiers for identifying a message to be transmitted from said first node to a node on the network corresponding to the transaction space in which the transaction identifier is stored.

* * * * *